(12) United States Patent
Cameron

(10) Patent No.: US 7,516,406 B1
(45) Date of Patent: Apr. 7, 2009

(54) PARTIAL FUNCTIONALITY INDICATOR

(75) Inventor: Stefan Cameron, Ottawa (CA)

(73) Assignee: Adobe Systems Incorporated, San Jose, CA (US)

( * ) Notice: Subject to any disclaimer, the term of this patent is extended or adjusted under 35 U.S.C. 154(b) by 312 days.

(21) Appl. No.: 11/447,769

(22) Filed: Jun. 6, 2006

(51) Int. Cl.
*G06F 3/048* (2006.01)

(52) U.S. Cl. ............... 715/710; 715/711; 715/762; 715/763; 715/764; 715/765; 715/777; 717/105; 717/109; 717/113; 717/116

(58) Field of Classification Search ............... 717/105, 717/109, 113, 116; 715/710, 711, 715, 762, 715/763, 764, 765, 777
See application file for complete search history.

(56) References Cited

U.S. PATENT DOCUMENTS

| | | | | |
|---|---|---|---|---|
| 5,001,654 A | * | 3/1991 | Winiger et al. ............... | 715/210 |
| 6,928,613 B1 | * | 8/2005 | Ishii et al. ............... | 715/726 |
| 7,149,983 B1 | * | 12/2006 | Robertson et al. ............ | 715/810 |
| 2005/0251748 A1 | * | 11/2005 | Gusmorino et al. ......... | 715/713 |
| 2007/0028175 A1 | * | 2/2007 | Moore et al. ............... | 715/733 |
| 2007/0139695 A1 | * | 6/2007 | Young et al. ............... | 358/1.15 |
| 2007/0216932 A1 | * | 9/2007 | Osadchyy et al. .......... | 358/1.15 |

* cited by examiner

*Primary Examiner*—Dennis-Doon Chow
*Assistant Examiner*—Patrick F Riegler
(74) *Attorney, Agent, or Firm*—Fulbright & Jaworski, L.L.P.

(57) ABSTRACT

A property inspector with a partial functionality indicator is described that analyzes a selected group of objects within the design canvas of an ADE to determine the properties available to each of the objects and also which of the properties applies to the individual objects. The inspector interacts with a user by identifying which properties apply to only some of the selected objects. This interaction may take on any useful form of sensual identification data, such as visible, audible, or tactile indications.

19 Claims, 9 Drawing Sheets

PARTIAL FUNCTIONALITY INDICATOR

TECHNICAL FIELD

The present invention relates, in general, to application development environments and, more particularly, to functionality indicators within an application development environment.

BACKGROUND OF THE INVENTION

In modern society, computers and electronic information permeate almost all aspects of life and business. In creating and developing the computer applications, graphics, electronic documents, forms, and other projects of the like, that make up the world of computing, developers typically use some kind of application development environment (ADE). ADEs allow the developers to code, script, or graphically create any variety of such projects. Some ADEs are general in nature, allowing for creation of various types of computer applications, graphics, or forms, while other ADEs are specific to the type of programming language or application that is being produced. For example, graphical ADEs, such as Adobe Systems Incorporated's ILLUSTRATOR®, FREEHAND®, and the like allow users to create graphics. Web ADEs, such as Adobe Systems Incorporated's DREAMWEAVER®, GOLIVE®, Microsoft Corporation's FRONTPAGE™, and the like, allow users to create Web pages, Websites, and other Internet-related content. Form ADEs, such as Adobe Systems Incorporated's ADOBE™ FORM DESIGNER, allow users to create sophisticated data capture forms, while word processing ADEs, such as Microsoft Corporation's, MS WORD™, Corel Corporation's WORDPERFECT™, and the like, allow users to create electronic documents, forms, and other such documents.

Many ADEs include user interface features referred to as inspectors or property inspectors to aid the developer/designer in creating the various projects. Inspectors are interface panels, windows, or windoids that are typically associated with particular features, sections, or elements of ADE menus or pallets. For example, when the user is working with the layout tools of an ADE, there may be a layout inspector which gives the layout information for any selected object. If the user then switches to a style panel that is featured in a particular ADE to see the styling of a particular object, there may also be a Cascading Style Sheet (CSS) inspector. Therefore, there may be multiple inspectors for one feature, pallet, menu, or the like. These inspectors provide a view into the data that pertains to the portion of the application document selected, and typically allow the user to change properties directly in the inspector window. Early property inspectors allowed a user to make a selection of a single object in the development canvas to display the properties of that element. The user would then be able to either change the properties by interacting with the object on the canvas, or change the object properties directly from the property inspector.

In many design-related activities, however, it is often desirable to make changes over a group of different objects on the design canvas. To facilitate this desired functionality, ADEs were developed that allow the user to select multiple objects on the design canvas in which the inspector would show properties for the group of objects. Such a group-enabled inspector is usually either "inclusive," meaning that it displays all of the properties as visible and usable, or enabled even though it may only apply property value changes to a subset of objects in the selected group, or it may be "exclusive," meaning that it only shows properties to be visible and usable, or enabled if all the properties pertain to each of the objects within the selection.

Novice users typically prefer the "exclusive" inspectors because the novice user may generally be confused when an "inclusive" inspector does not apply property value changes to all selected objects. Advanced users, on the other hand, typically prefer the "inclusive" inspectors because they allow the advanced users to make more sweeping changes to differing property sets regardless of whether a property pertains to a particular object. "Exclusive" property inspectors would generally prevent the advanced user from doing this. The disadvantage to the advanced user using an "inclusive" inspector, however, is that the advanced user would still generally prefer to know which properties apply only to some, but not all, of the selected objects.

Some property inspectors within various ADEs also provide for mixed data indicators, which define when a particular property has different values because the multiple objects within the group of selected objects to which it applies may not all have the same value. For example, if a property inspector in a graphical ADE identifies the X-coordinate of a group of several objections, it may display the word "mixed" or some other similar type of visual indicator because several of the objects have different X-coordinates which could not be displayed together in a meaningful way. However, the mixed data indicator does not indicate whether or not the property applies to all of the objects within the selection. Therefore, while this mixed data indicator assists in informing the user that there are multiple values for a particular property across several selected objects, it does not address the issue of the case in which a particular property only applies to some, but not all of the selected objects.

BRIEF SUMMARY

Representative embodiments of the present invention are directed to a system and method for a property inspector with a partial functionality indicator. The inspector analyzes a selected group of objects within the design canvas of an ADE to determine the properties available to each of the objects and also which of the properties applies to the individual objects. The inspector interacts with a user to identify which properties apply to only some of the selected objects. The interaction may take on any useful form, such as visible or audible indications. By providing this identification of partial functionality along with the properties that apply to both all of the objects and none of the objects, the novice user is able to see the properties that apply to all or none of the selected objects, while still allowing the advanced user to make changes on multiple property sets without being required to select only objects which completely pertain to those property sets.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1A:
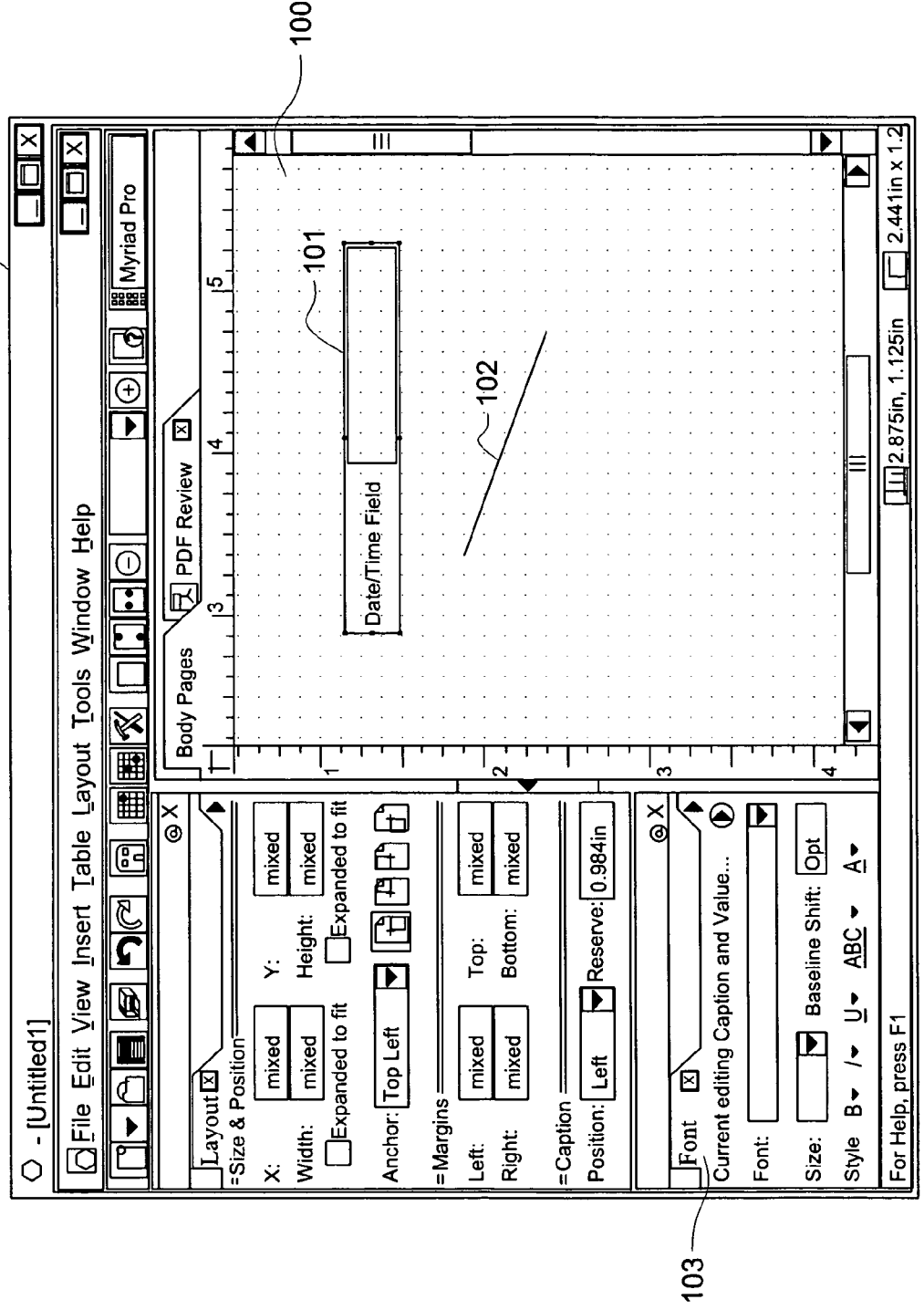
FIG. 1A is a screenshot illustrating an ADE which provides an exclusive font inspector.

FIG. 1A is a screenshot illustrating ADE 10 which provides exclusive font inspector 103. ADE 10 allows a developer to create content within development canvas 100. The developer has placed date/time field 101 and line 102 onto development canvas 100. When the developer selects date/time field 101, font inspector 103 displays each of the properties that apply to date/time field 101.

Figure 1B:
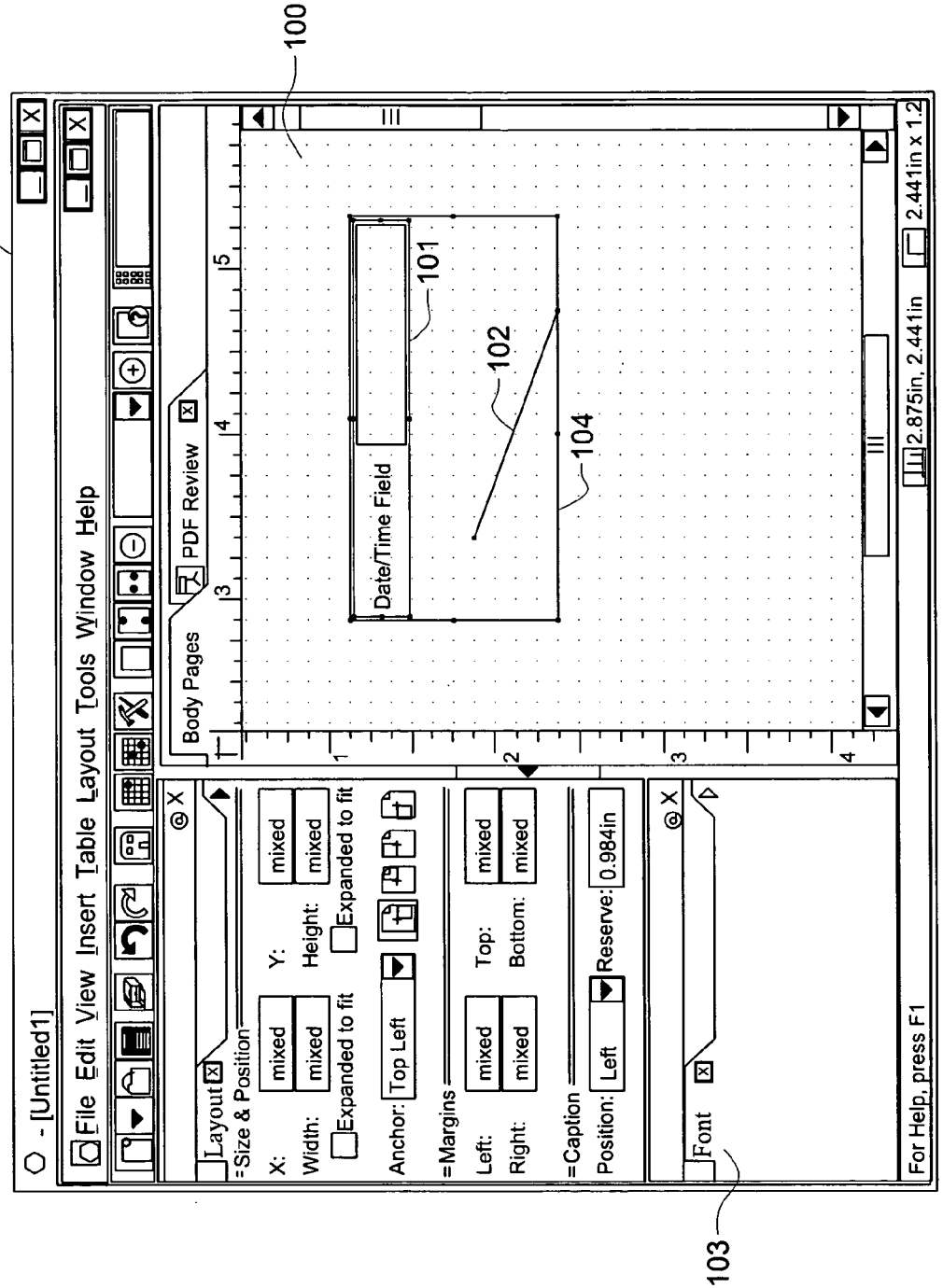
FIG. 1B is a screenshot illustrating an ADE with multiple objects selected within a development canvas.

FIG. 1B is a screenshot illustrating ADE 10 with multiple objects selected within development canvas 100. The developer selects both date/time filed 101 and line 102 within selection window 104. However, because font inspector 103 is exclusive, all of its properties are hidden from view. This obscuring of the font inspector 103 properties is caused because line 102 does not have any font capabilities. Therefore, because the properties of font inspector 103 do not potentially apply to all of the selected objects, they are not displayed to the user/developer.

Figure 1C:
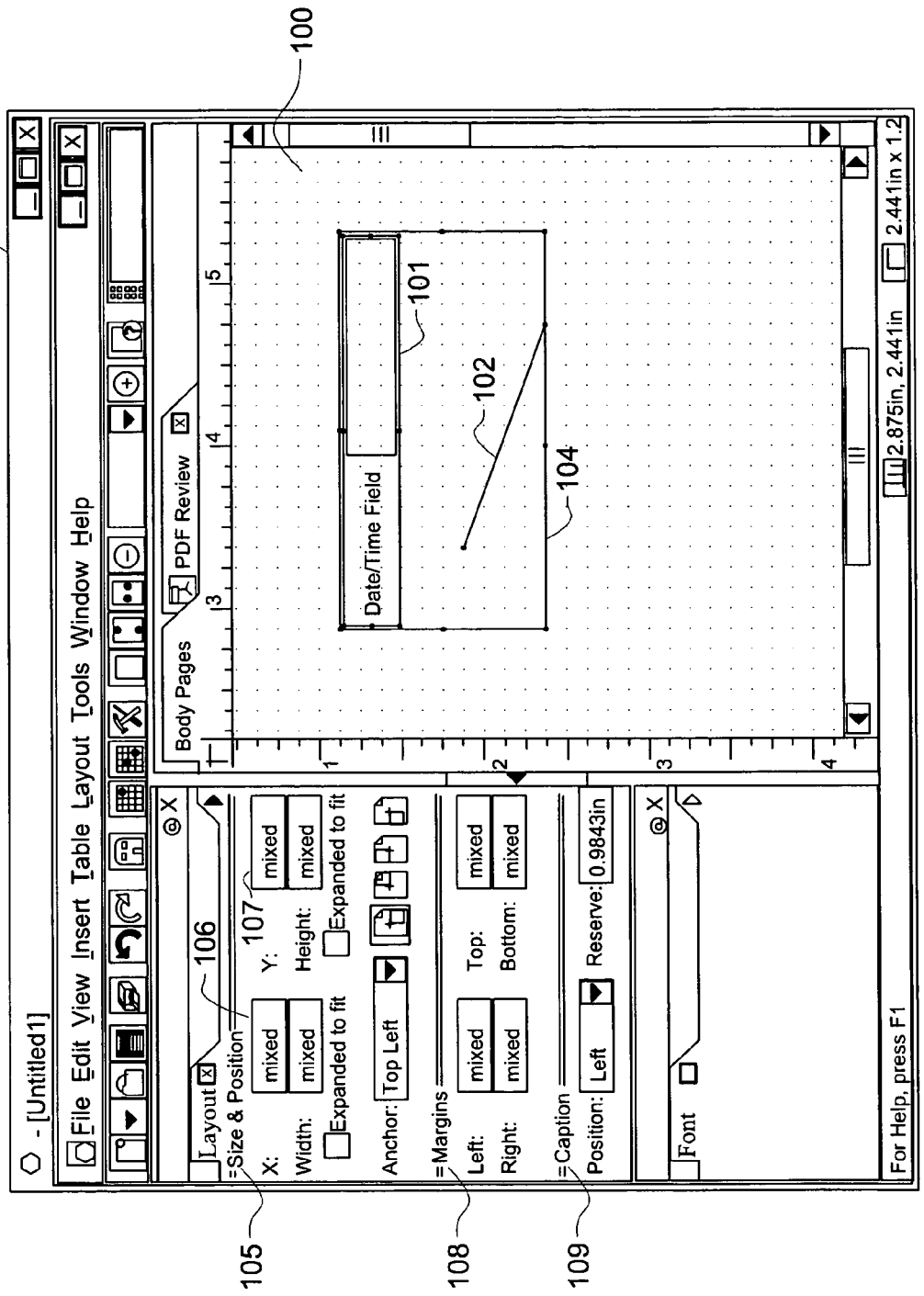
FIG. 1C is a screenshot illustrating an ADE having an inclusive layout inspector.

FIG. 1C is a screenshot illustrating ADE 10 having inclusive layout inspector 105. Here again, the developer has selected both date/time field 101 and line 102 within selection window 104. However, layout inspector 105 is inclusive, thus, it shows all of the layout properties; including the properties that do not apply to one or the other selected objects. For example, caption feature 109 is a property that may be part of date/time field 101, but does not apply to line 102. Even though it does not apply to all of the objects, caption feature 109 is still displayed to the developer.

FIG. 1C also illustrates the mixed functionality indicators. While date/time field 101 and line 102 do not share caption feature 109, they do share x-coordinates 106 and y-coordinates 107. However, both objects are lined up at different locations along development canvas 100. Therefore, x-coordinate 106 and y-coordinate 107 are shown as "mixed," because the value for each property is different for date/time field 101 and line 102.

ADE 10, as depicted in FIG. 1C, may actually confuse novice users. Because there is no indication otherwise, unless the user knows that caption feature 109 does not apply to line 102, he or she may still attempt to use it to manipulate line 102, or expect changes to caption feature 109 to be reflected in line 102. The user simply cannot tell which element or property will apply to one, the other, or both date/time field 101 and/or line 102.

Figure 2:
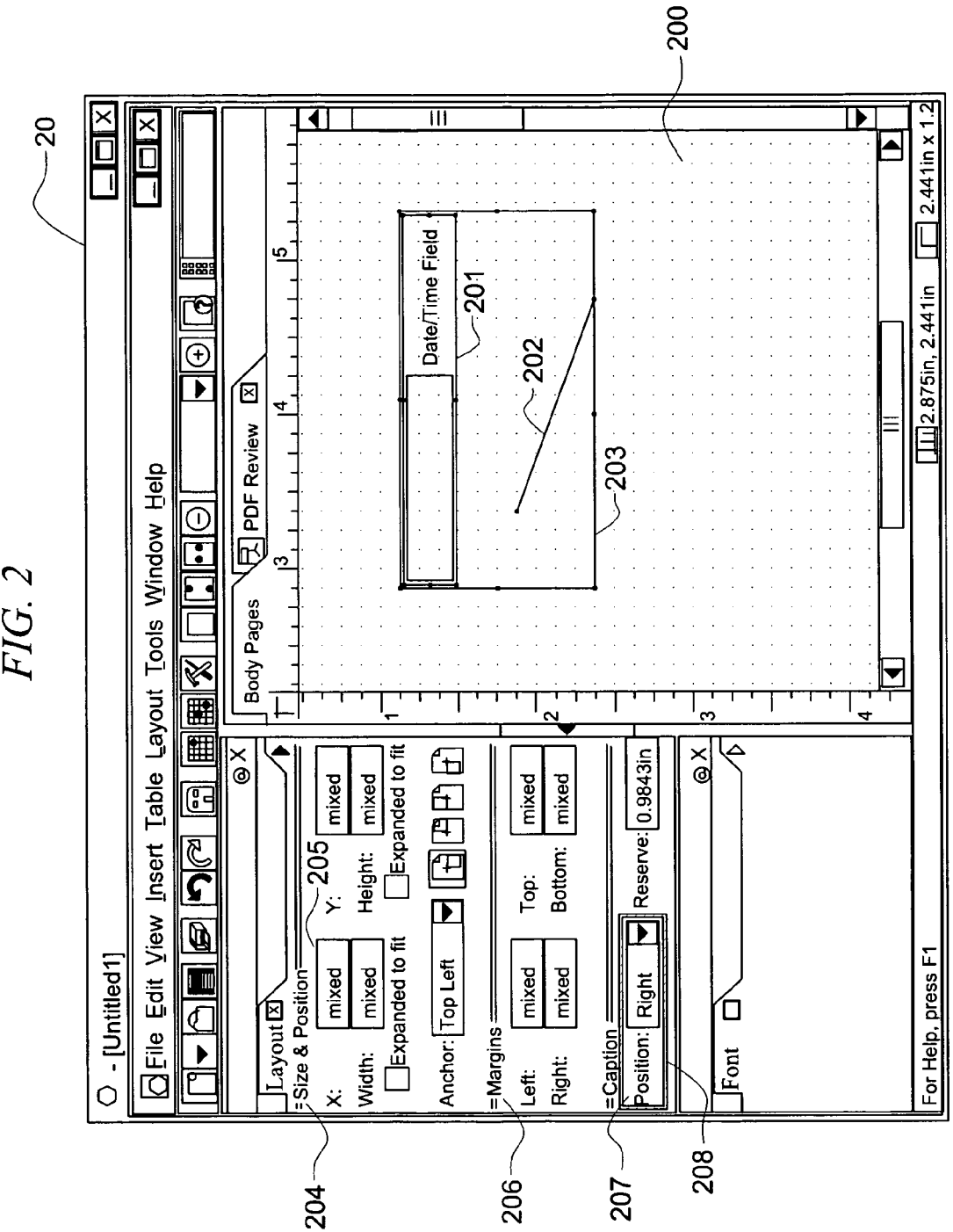
FIG. 2 is a screenshot illustrating an ADE configured according to one embodiment of the present invention.

FIG. 2 is a screenshot illustrating ADE 20 configured according to one embodiment of the present invention. The developer, using ADE 20, has placed date/time field 201 and line 202 onto design canvas 200 and selected both objects in selection window 203. ADE 20 includes layout inspector 204 that shows the layout properties of both date/time field 201 and line 202. Because line 202 does not have any facility for captions, position property 207 would not apply to line 202, but would apply to date/time field 201. When ADE 20 determines that position property 207 applies to some, but not all, of the objects selected in selection window 203, it displays identifier box 208 around position property 207. Identifier box 208 provides a visual indication to a user that position property 207 only applies to some of the selected objects.

Figure 3A:
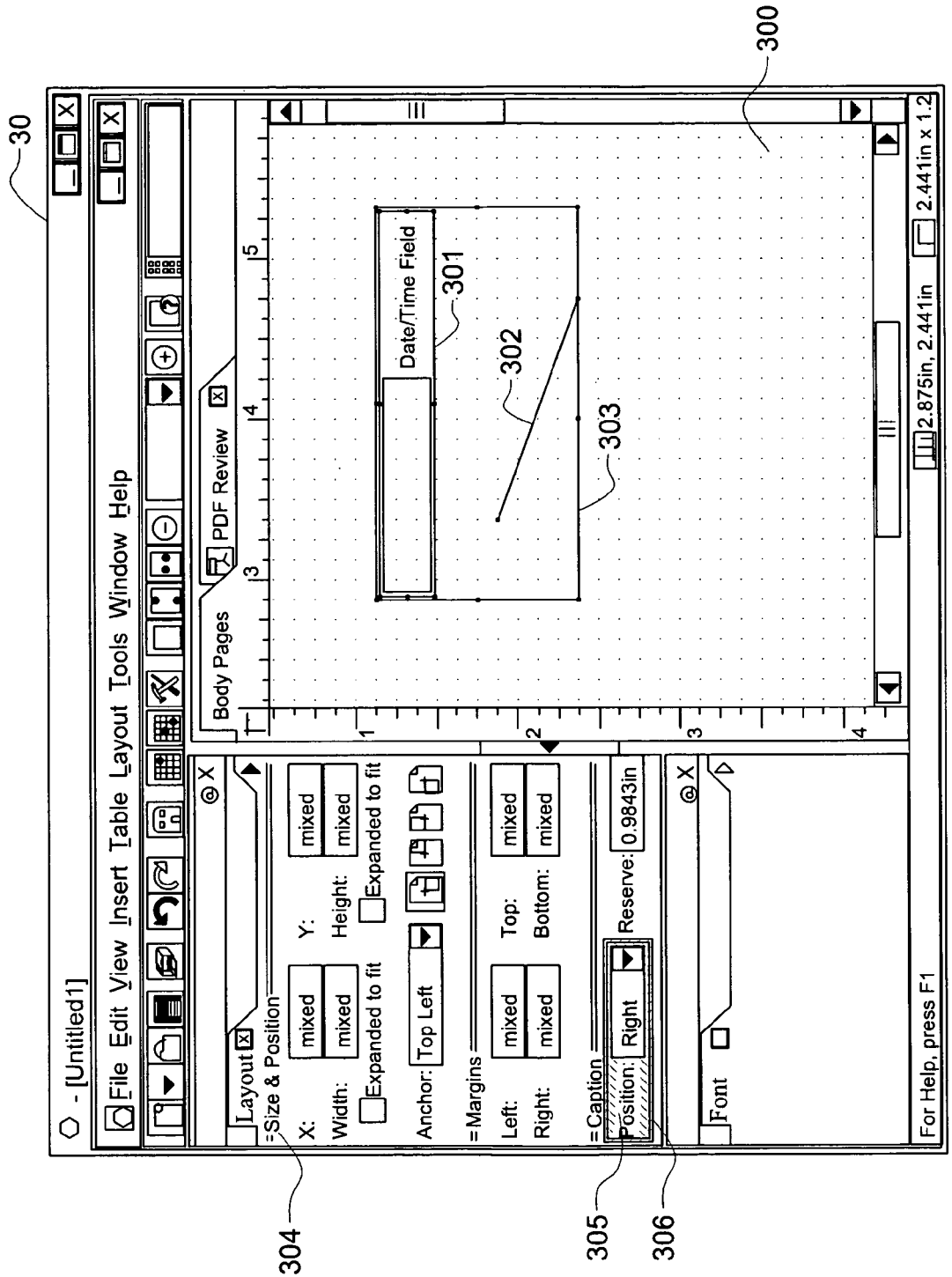
FIG. 3A is a screenshot illustrating an ADE configured according to another embodiment of the present invention.

FIG. 3A is a screenshot illustrating ADE 30 configured according to another embodiment of the present invention. In implementing the cue to the developer, many different interface methods may be used. When the developer places date/time field 301 and line 302 into selection window 303, ADE 30 indicates the partial functionality of position property 305 by placing highlight rectangle 306 around position property 305. Highlight rectangle 306 visually emphasizes position property 305 to the developer indicating that its properties apply only to some of the selected objects.

It should be noted that additional accessibility features may be added to address certain physical limitations of particular developers. For example, in FIG. 3A in addition to placing highlight rectangle 306 around position property 305, ADE 30 also plays an audible tone or triggers tactile feedback in a pointing device indicating that a partial functionality property exists in the selected group. Such sensual identification data (i.e., visual, audible, and/or tactile feedback) would be beneficial to both handicapped and non-handicapped developers. In addition to the presence of the audible indicator, ADE 30 would also play a second audible tone or tactile vibration when the developer drags his or her mouse pointer over the specific property listing in layout inspector 304. For example, hearing the initial audible tone or feeling the tactile feedback, the developer drags his mouse cursor over layout inspector 304. When the developer's cursor passes over position property 305, the second audible tone or tactile vibration is played indicating to the developer that position property 305 only applies to some of the selected objects.

Figure 3B:
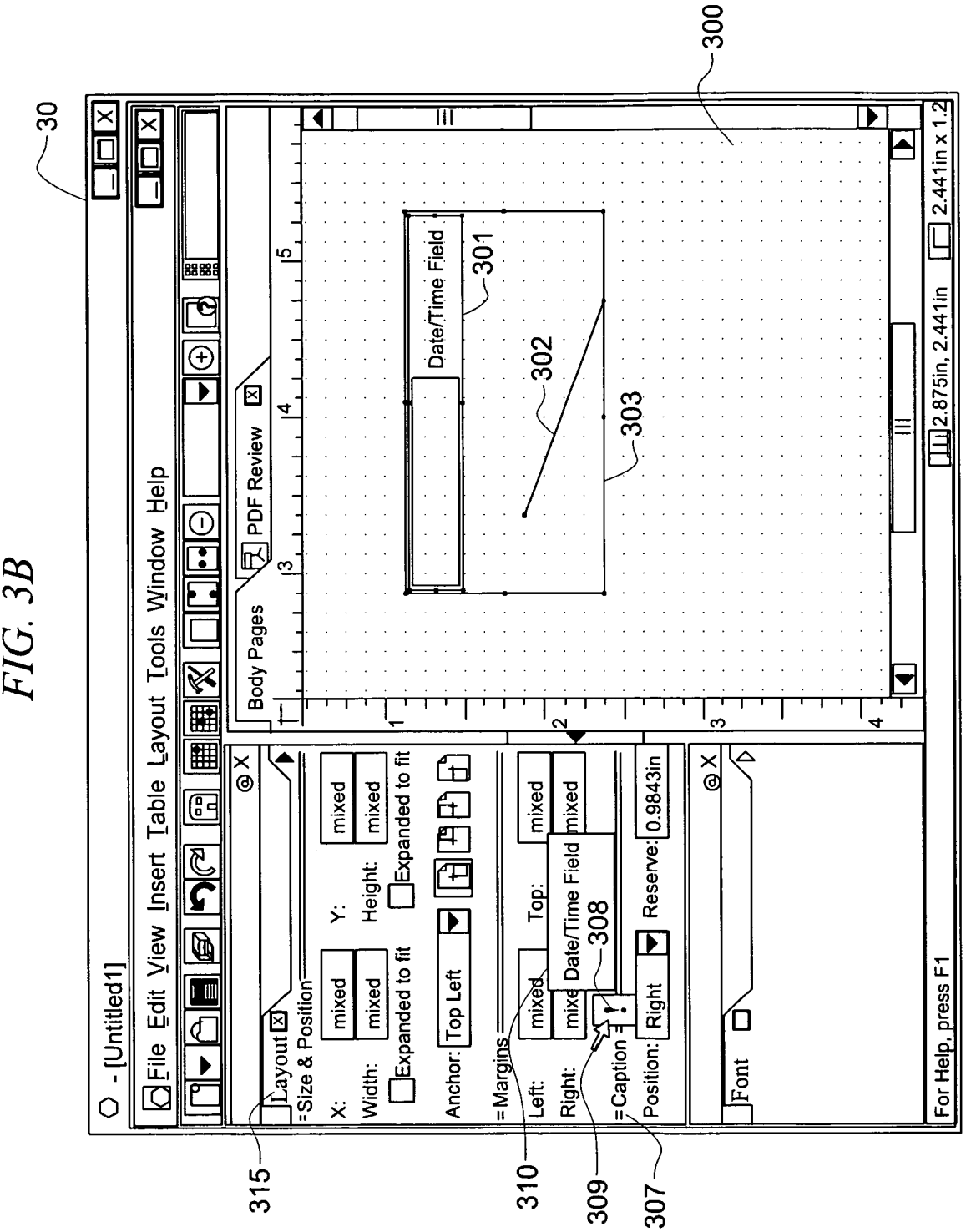
FIG. 3B is a screenshot illustrating an ADE 30 configured according to an embodiment of the present invention.

FIG. 3B is a screenshot illustrating ADE 30 configured according to an embodiment of the present invention. In the embodiment illustrated in FIG. 3B, instead of highlighting the property that is only partially applicable, ADE 30 places partial functionality icon 308 next to caption properties 307. Partial functionality icon 308 gives a visual indicator to the developer that caption properties 307 apply to some, but not all of the selected objects. For example, the developer placed date/time field 301 and line 302 into selection window 303. Because caption properties 307 would apply to date/time field 301 and not line 302, partial functionality icon is placed next caption properties 307 within layout inspector 315.

Additionally functionality may assist the developer in identifying not only that some partial functionality exists with respect to caption properties 307, but also which of the object(s) is applicable. To activate this feature, the developer hovers pointer 309 over partial functionality indicator 308. After a predetermined time hovering over partial functionality indicator 308, tool tip box 310 appears on top of layout inspector 315. Tool tip box 310 contains the name of the object that the functions and properties of caption properties 307 apply to, i.e., "date/time field." Thus, the embodiment depicted in FIG. 3B not only visually identifies the properties that are partially applicable to the selected objects, but also identifies the specific objects to which the functions and properties apply.

Figure 3C:
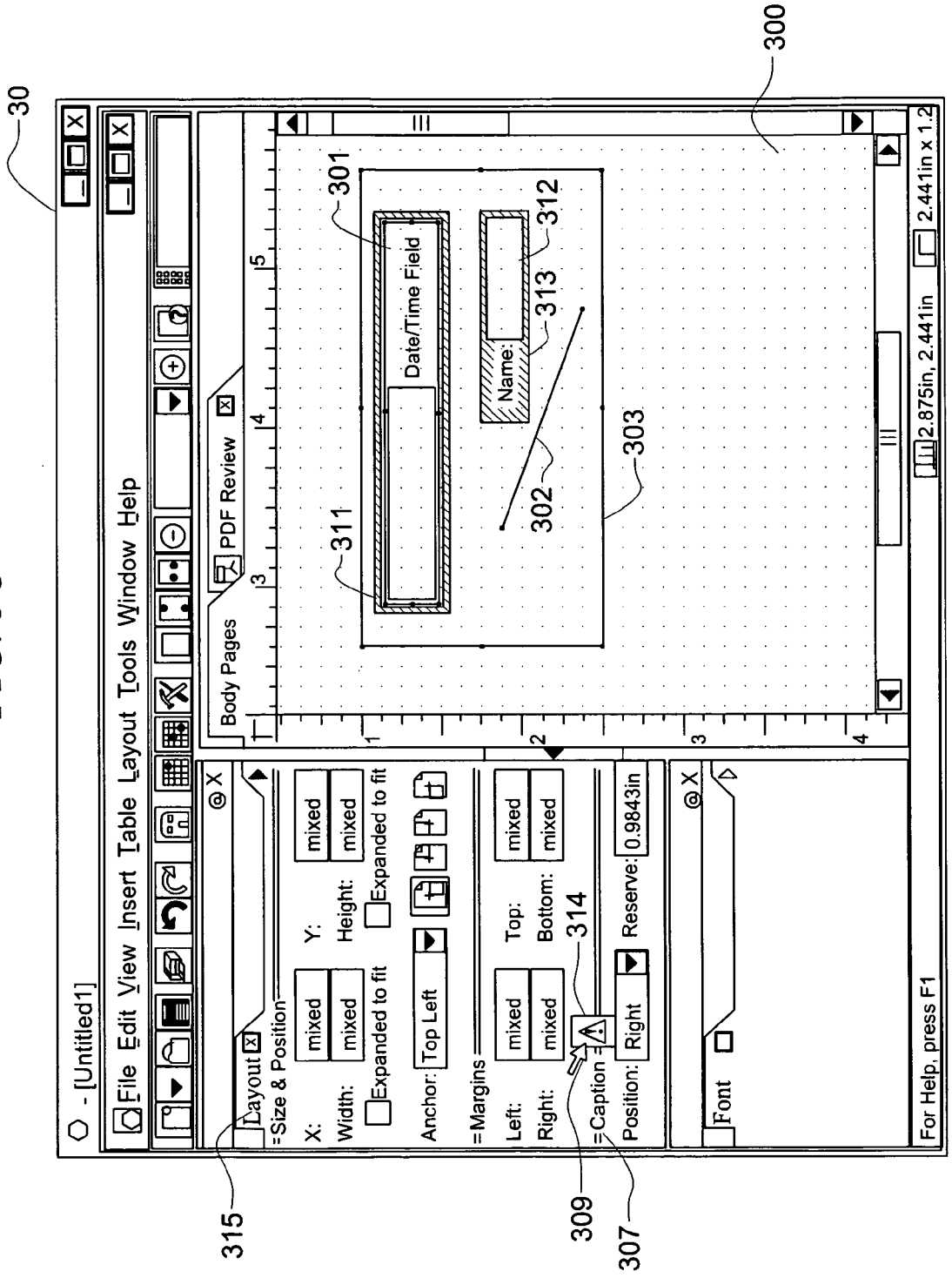
FIG. 3C is a screenshot illustrating an ADE 30 configured according to one embodiment of the present invention.

FIG. 3C is a screenshot illustrating ADE 30 configured according to one embodiment of the present invention. As shown, the developer has placed date/time field 301, line 302, and name field 312 into selection window 303. Upon selecting these objects, ADE 30 initiates the partial functionality feature in layout inspector 315. After determining that caption properties 307 apply to only some of the selected objects, partial functionality icon 314 is rendered or displayed on layout inspector 315 next to caption properties 307. Partial functionality icon 314 visually cues the developer that the features and properties of caption properties 307 only apply to some of the objects within selection window 303. To further identify the particular objects that the features and properties of caption properties 307 applies to, the developer hovers cursor 309 over partial functionality icon 314. As the developer hovers, highlight indicators 311 and 313 are placed around date/time field 301 and name field 312. Highlight indicators 311 and 313 give the developer visual feedback identifying the applicable objects directly within design canvas 300. With such a feature, the designer not only receives visual cues regarding which properties are applicable to only some of the selected objects, but also receives visual cues directly in the graphical design area, design canvas 300, pointing out which specific objects are applicable. This feature is particular beneficial to novice users who may not be as familiar with object names and other property details.

Figure 4:
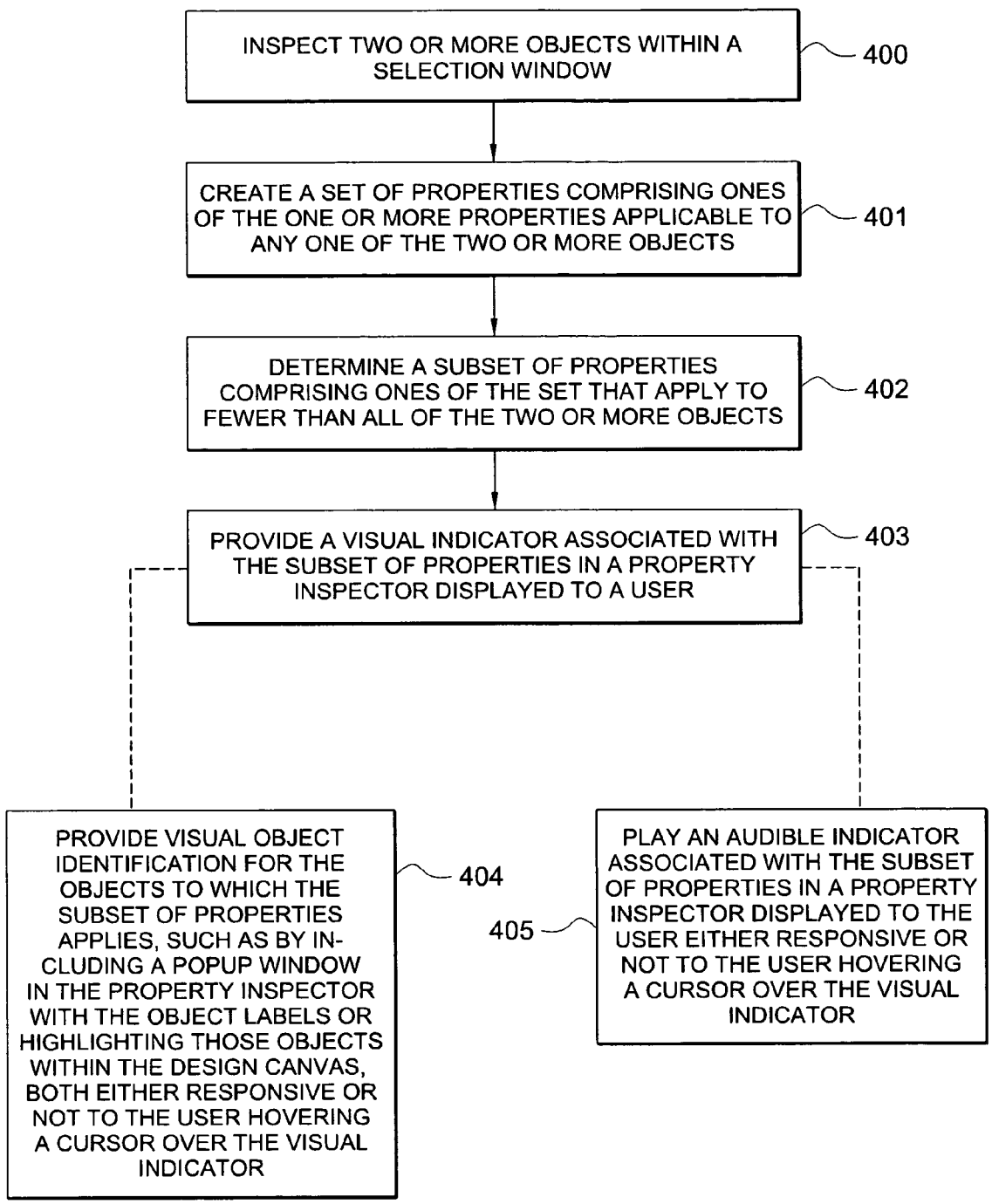
FIG. 4 is a flowchart illustrating example steps executed to implement one embodiment of the present invention.

FIG. 4 is a flowchart illustrating example steps executed to implement one embodiment of the present invention. In step 400, two or more objects within a selection window are inspected. A set of properties are created, in step 401, comprising ones of the one or more properties applicable to any one of the two or more objects. In step 402, a subset of properties is determined comprising ones of the set that apply to fewer than all of the two or more objects. A visual indicator is provided, in step 403, that is associated with the subset of properties in a property inspector displayed to a user.

Additional and alternative embodiments may also include alternative steps to implement the claimed invention. For example, in step 404, visual object identification is provided for the objects to which the subset of properties applies, such as by including a popup window in the property inspector with the object labels or highlighting those objects within the design canvas, both either responsive or not to the user hovering a cursor over the visual indicator. An object label may be any kind of name either selected by a designer or assigned automatically be the operating system to uniquely identify a particular object on the display. A further alternative step is reflected in step 405, in which an audible indicator is played that is associated with the subset of properties in a property inspector displayed to the user either responsive or not to the user hovering a cursor over the visual indicator.

In implementing the various embodiments of the present invention, different methods may be used to analyze the properties applicable to only part of a selected group of properties. The examples or descriptions of the FIGURES herein is not intended to limit the various embodiments of the present invention to any one particular method. In various embodiments, the ADE could use a map for the property inspector that ties a property name to a number or counter. As the ADE analyzes or inspects the objects within a particular selection area, it would query the object to see if it supported one of the aggregate properties. As it determines which properties are supported, it would increment the number mapped to the property name. The ADE may then use the map to determine which properties pertain to the selected objects. Based on those determinations, it would change the visibility and usability or hid the property's window within the property inspector.

Using the mapping method, if a property in the map has a count that is greater than or equal to zero but less than the total number of selected objects, the process makes that property's window visible and usable, as well as providing the visual cue indicating that its functionality is only partially applicable to the selected objects.

The program or code segments making up the various embodiments of the present invention may be stored in a computer readable medium. The "computer readable medium" may include any medium that can store information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium.

Figure 5:
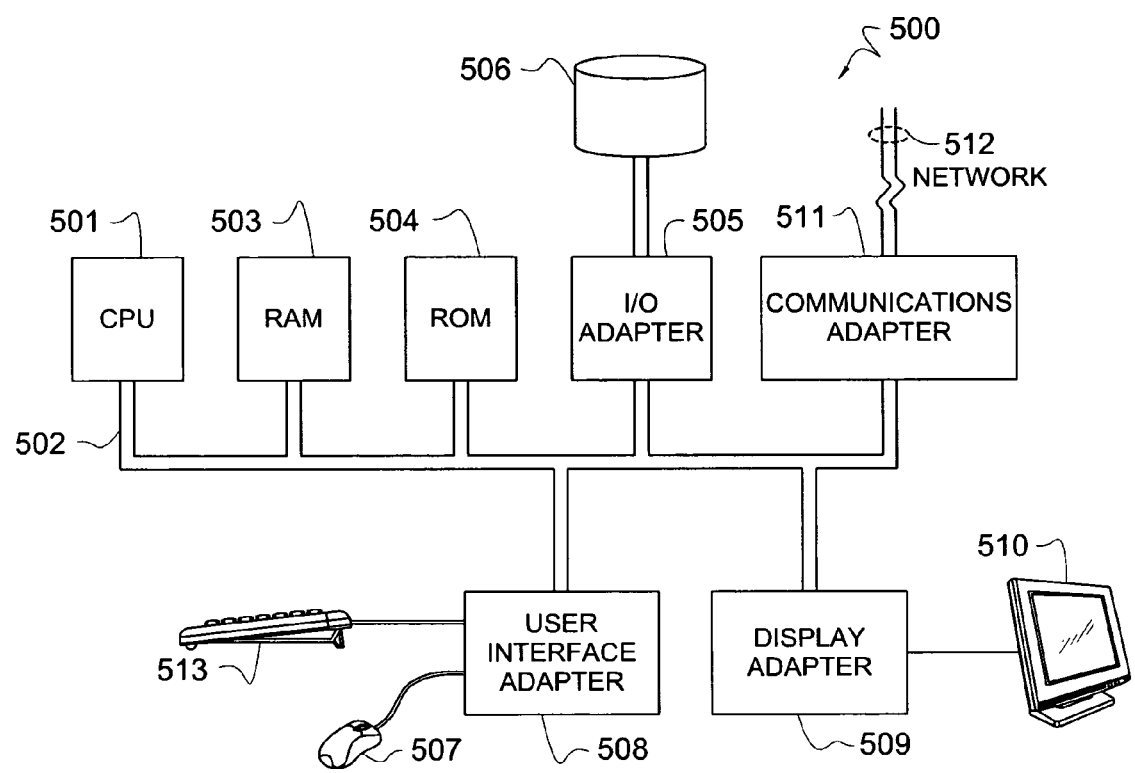
FIG. 5 illustrates a computer system adapted to use embodiments of the present invention.

FIG. 5 illustrates computer system 500 adapted to use embodiments of the present invention, e.g. storing and/or executing software associated with the embodiments. Central processing unit (CPU) 501 is coupled to system bus 502. The CPU 501 may be any general purpose CPU. However, embodiments of the present invention are not restricted by the architecture of CPU 501 as long as CPU 501 supports the inventive operations as described herein. Bus 502 is coupled to random access memory (RAM) 503, which may be SRAM, DRAM, or SDRAM. ROM 504 is also coupled to bus 502, which may be PROM, EPROM, or EEPROM. RAM 503 and ROM 504 hold user and system data and programs as is well known in the art.

Bus 502 is also coupled to input/output (I/O) controller card 505, communications adapter card 511, user interface card 508, and display card 509. The I/O adapter card 505 connects storage devices 506, such as one or more of a hard drive, a CD drive, a floppy disk drive, a tape drive, to computer system 500. The I/O adapter 505 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 511 is adapted to couple the computer system 500 to a network 512, which may be one or more of a telephone network, a local (LAN) and/or a wide-area (WAN) network, an Ethernet network, and/or the Internet network. User interface card 508 couples user input devices, such as keyboard 513, pointing device 507, and the like, to the computer system 500. The display card 509 is driven by CPU 501 to control the display on display device 510.

It should be noted that the examples illustrated and described herein contain only example editing content and application scenarios. The various embodiments of the present invention are not limited to only editing lines and time/date fields. These examples were used merely to describe the functionality of the representative embodiments.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   programmatically inspecting two or more objects within a selection window of an application development environment (ADE);
   creating a set of properties within said ADE comprising ones of one o1: more properties applicable to any one of said two or more objects;
   determining at said ADE a subset of properties comprising ones of said set that apply to fewer than all of said two or more objects;
   providing a visual indicator associated with said subset of properties in a property inspector of said ADE displayed to a user; and
   displaying a popup window associated with said visual indicator, wherein said popup window includes one or more object labels, wherein said one or more object labels reflect each of said two or more objects to which said subset of properties applies, and wherein said displaying is responsive to said user hovering a pointing cursor over said visual indicator.

2. The method of claim 1 further comprising:
   rendering a visual cue associated with ones of said two or more objects to which said subset of properties applies, wherein said visual cue is rendered associated with said ones of said two or more objects on a design canvas of said ADE.

3. The method of claim 2 wherein said rendering is responsive to said user hovering a pointing cursor over said visual indicator.

4. The method of claim 1 further comprising:
   playing an audible indicator associated with said subset of properties in said property inspector displayed to said user.

5. The method of claim 4 wherein said playing is responsive to said user hovering a pointing cursor over said visual indicator.

6. A computer program product having a computer readable medium with computer program logic recorded thereon, said computer program product comprising:
   code for analyzing two or more selected objects within a design canvas of an application development environment (ADE);
   code for identifying a plurality of object properties applicable to two or more selected objects;
   code for determining a subset of said plurality of object properties, wherein said subset of properties comprises one or more properties applicable to less than all of said two or more selected objects;
   code for rendering a visual cue associated with said subset in a property inspector displayed to a user;
   code for receiving data indicating a cursor hovering over said visual cue; and
   code, executable responsive to results of said code for receiving, for displaying a tool tip window within said property inspector, wherein said tool tip window includes one or more labels identifying said less than all of said two or more selected objects to which said subset of properties applies.

7. The computer program product of claim 6 further comprising:
   code for highlighting said less than all of said two or more selected objects to which said subset of properties applies within said design canvas.

8. The computer program product of claim 7 further comprising:
   code for receiving data indicating a cursor hovering over said visual cue, wherein said code for highlighting is executed in response to results of said code for receiving.

9. The computer program product of claim 6 further comprising:
   code for playing an audible cue associated with said subset of properties, wherein said code is executed responsive to results of said code for determining.

10. The computer program product of claim 9 wherein said code for playing is executed in response to results of executing one or more of:
    code for receiving data indicating a cursor hovering over said visual cue; and
    code for receiving data indicating said cursor hovering over one of said less than all of said two or more selected objects to which said subset of properties applies within said design canvas.

11. A method comprising:
    receiving a selection event from a user defining two or more selected objects within a user interface (UI) of an application development environment (ADE);
    analyzing said two or more selected objects;
    identifying a plurality of properties applicable to any one of said two or more selected objects;
    compiling a list of properties from said plurality, wherein said list comprises ones of said plurality applicable to fewer than all of said two or more selected objects;
    providing sensual identification to said user of each property within said list that is displayed on said property inspector;
    receiving interface data reflecting said user hovering a cursor in relation to said sensual identification;
    responsive to said receiving interface data, rendering a popup box containing a name of each of said two or more selected objects to which said identified property within said list applies.

12. The method of claim 11 further comprising:
    highlighting on said UI each of said two or more selected objects to which said identified property within said list applies.

13. The method of claim 12 wherein said highlighting is responsive to receiving interface data reflecting said user hovering a cursor in relation to said sensual identification.

14. The method of claim 11 wherein said sensual identification comprises:
    a visual indicator associated with each property within said list; and
    an audible tone.

15. A computer system having a CPU comprising:
    means for inspecting two or more objects within a selection window in an application development environment (ADE);
    means for creating a set of properties comprising ones of one or more properties applicable to any one of said two or more objects;
    means for determining a subset of properties comprising ones of said set that apply to fewer than all of said two or more objects;
    means for providing a visual indicator associated with said subset of properties in a property inspector displayed to a user; and
    means for displaying a popup window containing one or more object labels, wherein said one or more object labels reflect each of said two or more objects to which said subset of properties applies, and wherein said means for displaying is provided responsive to said user hovering a pointing cursor over said visual indicator.

16. The computer system of claim 15 further comprising:
means for rendering a visual cue associated with ones of said two or more objects to which said subset of properties applies, wherein said visual cue is rendered associated with said ones of said two or more objects on a design canvas of said ADE.

17. The computer system of claim 16 wherein said means for rendering is provided responsive to said user hovering a pointing cursor over said visual indicator.

18. The computer system of claim 15 further comprising:
means for playing an audible indicator associated with said subset of properties in a property inspector displayed to said user.

19. The computer system of claim 18 wherein said means for displaying is provided responsive to said user hovering a pointing cursor over said visual indicator.

* * * * *

UNITED STATES PATENT AND TRADEMARK OFFICE
CERTIFICATE OF CORRECTION

PATENT NO. : 7,516,406 B1 Page 1 of 1
APPLICATION NO. : 11/447769
DATED : April 7, 2009
INVENTOR(S) : Stefan Cameron It is certified that error appears in the above-identified patent and that said Letters Patent is hereby corrected as shown below:

Column 7, Claim 1, Line 7, delete the portion of text reading "one o1: more" and replace with --one or more--.

Signed and Sealed this

Nineteenth Day of May, 2009

JOHN DOLL
*Acting Director of the United States Patent and Trademark Office*